United States Patent
Araki et al.

(10) Patent No.: US 6,319,580 B1
(45) Date of Patent: Nov. 20, 2001

(54) RECORDING DISK AND PRODUCING METHOD THEREFOR

(75) Inventors: Tatsuo Araki, Otsu; Hiroyuki Ohta, Kyoto; Susumu Shibasaki, Tsukuba; Hiroyuki Hirata, Otsu; Osamu Ishizaki, Suita; Tsuyoshi Maro, Kyoto, all of (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/333,960

(22) Filed: Jun. 16, 1999

(30) Foreign Application Priority Data

Jun. 16, 1998 (JP) .................................................. 10-168116

(51) Int. Cl.⁷ ........................................................ B32B 3/02
(52) U.S. Cl. ........................ 428/64.1; 428/64.4; 428/64.7; 428/913; 430/270.11
(58) Field of Search ...................... 428/64.1, 64.2, 428/64.4, 64.7, 913; 430/270.11, 495.1, 945; 369/283

(56) References Cited

U.S. PATENT DOCUMENTS

| | | | |
|---|---|---|---|
| 4,908,250 | * | 3/1990 | Gotoh .................................. 428/64.1 |
| 5,204,153 | * | 4/1993 | Matsui ................................ 428/64.1 |
| 5,312,663 | * | 5/1994 | Kosinski ............................. 428/64.1 |
| 5,382,460 | * | 1/1995 | Onagi ................................. 428/64.1 |
| 5,989,669 | * | 11/1999 | Usami ................................ 428/64.1 |

FOREIGN PATENT DOCUMENTS

| | | |
|---|---|---|
| 62231733 | 10/1987 | (JP) . |
| 5212755 | 8/1993 | (JP) . |
| 877602 | 3/1996 | (JP) . |

* cited by examiner

Primary Examiner—Elizabeth Evans
(74) Attorney, Agent, or Firm—Birch, Stewart, Kolasch & Birch, LLP

(57) ABSTRACT

A recording disk comprises a substrate including a plastic material, and an overlay arranged over the substrate and including a recording substance for recording therein an information, and a radially-outer periphery of the overlay is received within a radially-outer periphery of the substrate as seen in an axial direction of the recording disk.

21 Claims, 3 Drawing Sheets

FIG.5

|  | OUTER PERIPHERY REMOVALPROCESS |  |
|---|---|---|
| EMBODIMENT 1 | CUTTING AFTER OVERLAY FORMATION | BURNISHED |
| EMBODIMENT 2 | LASER AFTER OVERLAY FORMATION | BURNISHED |
| EMBODIMENT 3 | WATER AFTER OVERLAY FORMATION | NOT-BURNISHED |
| EMBODIMENT 4 | OUTER AFTER OVERLAY FORMATION | BURNISHED |
| SAMPLE 1 | NOTE | BURNISHED |
| SAMPLE 2 | OUTER BEFORE OVERLAY FORMATION | BURNISHED |
| SAMPLE 3 | CUTTING AFTER OVERLAY FORMATION | BURNISHED |
| SAMPLE 4 | CUTTING BEFORE OVERLAY FORMATION | BURNISHED |

FIG.7

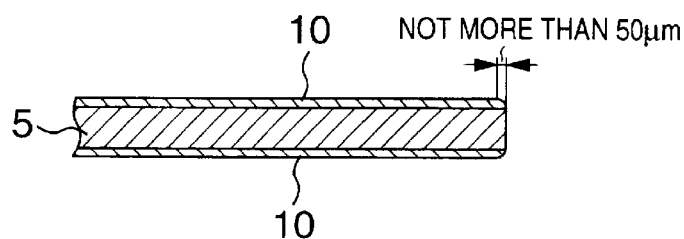

FIG.6

| | THICKNESS VARIATION RATE (%) | OVERLAY EXCEEDING BEYOND SUBSTRATE OUTER PERIPHERY | OUTER PERIPHERY RADIAL DISTANCE BETWEEN OVERLAY AND SUBSTRATE (μm) | HIT NUMBER ON DISK BY SLIDER HEAD | DISK SURFACE CONDITION AFTER HEAD SLIDE | CORROSION |
|---|---|---|---|---|---|---|
| EMBODIMENT 1 | 0.15 | × | 20 | 1 | ☆ | ○ |
| EMBODIMENT 2 | 0.12 | × | 10 | 2 | ☆ | ○ |
| EMBODIMENT 3 | 0.17 | × | 40 | 4 | × | ○ |
| EMBODIMENT 4 | 0.16 | × | 30 | 2 | ☆ | ○ |
| SAMPLE 1 | 0.52 | ○ | | 150 | × | × |
| SAMPLE 2 | 0.15 | ○ | | 100 | ▷ | × |
| SAMPLE 3 | 0.31 | × | 100 | 50 | × | ◁ |
| SAMPLE 4 | 0.17 | ○ | | 500 | ▷ | × |

RECORDING DISK AND PRODUCING METHOD THEREFOR

BACKGROUND OF THE INVENTION AND RELATED ART STATEMENT

The present invention relates to a recording disk in which an information is recorded by electrical, magnetic and/or optical characteristic change therein caused by thermal, electrical, magnetic and/or optical energy applied to the recording disk, and a producing method therefor.

JP-A-5-212755 discloses a method for producing a substrate of a recording disk from a thermoplastic resin while controlling a temperature distribution in a molding die to obtain an evenness in thickness of the substrate in a radial direction of the recording disk.

JP-A-62-231733 discloses a method for obtaining a flat surface of a ring-shaped recording disk substrate made of a plastic material by removing simultaneously outer and inner peripheral portions of the substrate whose surfaces have relatively lower flatness.

JP-A-8-77602 discloses an optical recording medium substrate whose outer peripheral area in which an optical characteristic is deteriorated is removed to expand a recordable area radially outward on the substrate.

OBJECT AND SUMMARY OF THE INVENTION

An object of the present invention is to provide a recording disk comprising a substrate including a plastic material and an overlay including a recording substance for recording therein an information, in which recording disk the overlay is restrained from being injured.

In a recording disk comprising a substrate including a plastic material, and an overlay arranged over the substrate and including a recording substance for recording therein an information, since a radially-outer periphery of the overlay is substantially within a radially-outer periphery of the substrate as seen in an axial direction of the recording disk, that is, the radially-outer periphery of the overlay extends substantially along the radially-outer periphery of the substrate and/or at a radially inner side with respect to the radially-outer periphery of the substrate, or is substantially prevented from extending radially outward beyond the radially-outer periphery of the substrate (while a slight burr or a significantly small and thin projection of the overlay inevitably formed by a treatment of the radially outer periphery of the overlay and/or the substrate may extend radially outward beyond the radially-outer periphery of the substrate) as seen in the axial direction, the overlay is securely supported on the substrate, or is prevented from bearing a most of a supporting or holding force of the recording disk applied to a radially-outer periphery of the recording disk, so that the overlay is restrained from being injured.

It is preferable that the substrate includes a main surface which extends substantially perpendicular to the axial direction and on which the overlay is arranged, and a side surface which extends radially outward from the main surface and is prevented from extending parallel to the main surface, the overlay includes a front surface extending substantially parallel to the main surface and exposed to the environment of the recording disk and an edge surface extending radially outward from the front surface, prevented from extending parallel to the front surface and exposed to the environment of the recording disk, and a radially-outer periphery of the front surface is substantially within a boundary between the main surface and the side surface, that is, the radially-outer periphery of the front surface extends substantially along the boundary between the main surface and the side surface and/or at a radially inner side with respect to the boundary between the main surface and the side surface (while the slight burr or the significantly small and thin projection of the overlay inevitably formed by the treatment of the radially outer periphery of the overlay and/or the substrate may extend radially outward beyond the boundary between the main surface and the side surface)as seen in the axial direction, so that an outer peripheral edge of the front surface on which a slider head run is more securely protected by the substrate and bears none of the supporting or holding force of the recording disk applied to the radially-outer periphery of the recording disk, so that the front surface is more securely prevented from being injured by the supporting or holding force. It is preferable that the radially-outer periphery of the front surface is radially inward distant from the boundary between the main surface and the side surface as seen in the axial direction, so that the outer peripheral edge of the front surface on which a slider head run is further securely protected by the substrate and bears none of the supporting or holding force of the recording disk applied to the radially-outer periphery of the recording disk, so that the front surface is further securely prevented from being injured by the supporting or holding force while a recording area formed on the front surface is kept large. It is preferable that a radial distance between the radially-outer periphery of the front surface and the boundary between the main surface and the side surface as seen in the axial direction is not more than 50 $\mu$m.

If the substrate includes a main surface (extending perpendicular to a rotational axis of the recording disk) on which the overlay is arranged and a side surface which extends radially outward from the main surface and is prevented from extending parallel to the main surface, and the overlay is prevented from extending on at least a part of the side surface, a moisture can be discharged radially outward from the substrate to an environment thereof through the at least a part of the side surface so that a chemical reaction of the overlay and/or the substrate and/or a separation of the overlay from the substrate caused by the moisture is restrained. The moisture discharge from the at least a part of the side surface is accelerated by a rotation of the recording disk on the axial axis thereof.

When the substrate includes a main surface on which the overlay is arranged and a side surface which extends radially outward from the main surface and is prevented from extending parallel to the main surface, and the overlay extends to a boundary between the main surface and the side surface, a continuity in surface shape of the recording disk is improved to reinforce a resistance against a corrosion and an exfoliation of the overlay.

When the substrate includes a main surface on which the overlay is arranged and a side surface which extends radially outward from the main surface, is prevented from extending parallel to the main surface and exposed to an environment of the recording disk, the overlay includes a front surface extending substantially parallel to the main surface and exposed to the environment of the recording disk and an edge surface extending radially outward from the front surface, prevented from extending parallel to the front surface and exposed to the environment of the recording disk, and an angle formed in the substrate between the main surface and a tangential line of the edge surface is more than 90 degrees (preferably not less than 120 degrees), an exfoliation and/or chip-off of the overlay at a joint point between the main surface and the edge surface is restrained, the continuity in surface shape of the recording disk is improved to reinforce the resistance against the corrosion and the exfoliation of the overlay.

When the substrate includes a main surface on which the overlay is arranged and a side surface which extends radially outward from the main surface and is prevented from extending parallel to the main surface, and an angle formed in the substrate between the main surface and a tangential line of the side surface is more than 90 degrees (preferably not less than 120 degrees), a chip-off of the substrate at a boundary between the main surface and the side surface is restrained.

When the substrate includes a main surface on which the overlay is arranged and an radially-outer-peripheral edge surface arranged at a relatively radially outer side with respect to the main surface, an imaginary tangential line of at least a part of which radially-outer-peripheral edge surface extends substantially parallel to the axial direction, and the whole of the radially-outer-peripheral edge surface is prevented from holding thereon the overlay, the supporting or holding force of the recording disk generally applied to the radially-outer periphery of the recording disk is not applied to the overlay so that the injury of the overlay is restrained.

When the substrate includes a main surface on which the overlay is arranged and a side surface which extends radially outward from the main surface and is prevented from extending parallel to the main surface, and the whole of the side surface is prevented from holding thereon the overlay, the supporting or holding force of the recording disk generally applied to the radially-outer periphery of the recording disk is securely prevented from being applied to the overlay so that the injury of the overlay is securely prevented.

The substrate may include at each of axial sides thereof a main surface on which the overlay is arranged. The plastic material may include at least one of polycarbonate, thermoplastic resin of norbornene type (for example, amorphous-polyolefine), polyethelsulfone, phenolic resin, and polyethel-imide. The overlay includes a recording layer including the recording substance and a hard protect layer covering the recording layer. The overlay preferably includes an electrically conductive metallic substance to prevent the surface of the recording disk from being charged with electricity.

According to the present invention, a method for producing a recording disk including a substrate and an overlay on the substrate, comprises the steps of:

forming the substrate including a plastic material, forming on the substrate the overlay including a recording substance for recording therein an information, and removing a radially-outer peripheral part of the substrate after forming the overlay.

Since the radially-outer peripheral part of the substrate is removed after forming the overlay, a contaminant formed during the removal of the radially-outer peripheral part of the substrate is prevented from being arranged between the substrate and the overlay so that a high adhesive strength therebetween is obtained and a flatness of a surface of the overlay exposed to the environment of the recording disk is prevented from being deteriorated by the contaminant.

A disk thickness variation rate on the radially-outer peripheral part before removing the radially-outer peripheral part is more than 0.2 (%), when the disk thickness variation rate=100*$\Delta t/\Delta r$ (%), $\Delta r$ is a unit radial length value, and $\Delta t$ is a thickness variation value in the unit radial length, so that the disk thickness variation rate over the recording disk is not more than 0.2% preferable for restraining an excessive separation and a collision between the overlay and a slider head for recording the information onto and/or reading the information out from the recording disk.

If a radially-outer peripheral part of the overlay is removed simultaneously with removing the radially-outer peripheral part of the substrate, the continuity in surface shape of the recording disk is improved.

It is preferable for the removal of the radially-outer peripheral part of the substrate to be carried out by a cutting bite (preferably, forming cutter) while rotating the recording disk. A laser beam or a water jet may carry out the removal of the radially-outer peripheral part of the substrate.

It is preferable that a surface of the overlay to be exposed to an environment of the recording disk is made contact with a cleaning element (for tape cleaning, slider-head burnishing or the like) to remove a contaminant from the surface by a contact-slide relative movement between the surface and the cleaning element, after removing the radially-outer part of the substrate.

The overlay usable for optical recording may include a reflection layer, a first dielectric layer (optionally arranged) on the reflection layer, a recording layer on the first dielectric layer, a transparent dielectric layer (as a second dielectric layer) on the recording layer, a protect layer on the transparent dielectric layer and a lubricant layer on the protect layer. The protect layer may include a carbon, a carbon-hydride, a carbon-nitride, DLC (diamond like carbon), a compound of silicon and carbon or the like. The recording layer for optomagnetic recording may include TbFeCo, DyFeCo, a pair of layers of GdFeCo and TbFeCo, substance usable for magnetic super-resolution, or the like. The recording layer for phase shift recording may include GeSbTe, InAgSn or the like. The recording layer for write-once recording may include coloring matter, GeSbTe, TePbSe, AuSn or the like.

The first and second dielectric layers may include generally known ceramic, for example, $SiN_x$, $SiO_x$, $SiC_x$, $SiN_xO_y$, $SiC_xO_y$, $SiC_xN_yO_z$, $AlN_x$, $AlSi_xN_yO_z$, $AlO_x$, ZnS, $TaO_x$, $TiO_x$, carbon-hydride, DLC or the like. The $AlN_x$, $AlSi_xN_y$, carbon-hydride, DLC or the like are preferable for their high thermal conductivity.

The reflection layer may include Al, Al-alloy (AlTi, AlCr, AlTe, AlNd, AlNb, AlCu, AlAg, AlAu or the like), Cu, Cu-alloy, Ag, Ag-alloy, Au, Au-alloy, or the like. The lubricant may include purfluoropolyether, a derivative including alcohol-radical, carboxyl-radical or piperonal-radical, saturated fatty acid, unsaturated fatty acid, metallic salt of the acid or the like. A ceramic layer of $SiO_x$, $SiN_x$, $AlN_x$, $TaO_x$ or the like, or a metallic amorphous layer of Nip, NiB, CoZr, CoMo, AlTa, AlCr or the like may be arranged between the substrate and the reflection layer for resistance against corrosion. A layer of Ti, Ta, Cr, Mo, V, Nb or the like may be arranged between the layers to increase an adhesive strength therebetween.

The overlay of the present invention is applicable to an overwrite recording in which a recording hole is formed in an inorganic layer of organic coloring matter, Te compound or the like by laser, an optomagnetic rewrite recording in which a rare metal layer of TbFeCo, DyFeCo or the like and an alloy layer of transition metal are used as the recording layer, a phase-shift rewrite recording in which a structural phase of the recording layer of Ge alloy, In alloy or the like is changeable between crystal phase and amorphous phase, or the like. A surface pit, hole, a reflectance difference between crystal phase and amorphous phase for read-only recording may be usable for the overlay of the present invention.

If the overlay of the present invention is applied to a magnetic recording, an under layer of Cr, Mo, Al, Ti, Si or the like on the substrate, a magnetic layer on the under layer of Co alloy, for example, CoCr, CoPt, CoCrNi, CoCrPt, CoCrNiPt, CoCrPtTa, CoCrPtW, CoCrPtWo, CoCrPtNb, CoCrPtTi, CoNiPt, CoNiPtTa, CoNiPtW, CoNiPtMo, CoNiPtNb, CoNiPtTi, CoCrTa, CoNiCrPtTa, CoNiCrPtW, CoNiCrPtMo, CoNiCrPtNb, CoNiCrPtTi or the like, and the protect layer on the magnetic layer of C, SiN, SiC, $SiO_2$ or the like are formed as the overlay by sputtering or the like. A lubricant of hydrocarbon type or fluorocarbon type is applied onto the protect layer by spin coating or the like. The magnetic layer may be divided into at least two stacked layers by a non-magnetic layer of Cr, Mo, Ag or Cr alloy. At least two Co-alloy layers having respective compositions different from each other may be directly stacked.

BRIEF DESCRIPTION OF THE DRAWINGS

FIG. 5 is a table showing treatment for embodiments and samples.

FIG. 6 is a table showing experimental results of the embodiments and samples.

FIG. 7 is a partial cross-sectional view of another recording disk after the another recording disk with the overlay on the substrate is treated.

DETAILED DESCRIPTION OF PREFERRED EMBODIMENTS

Figure 1:
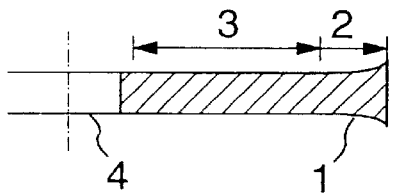
FIG. 1 is a partial cross-sectional view of a substrate before being treated.
Figure 2:
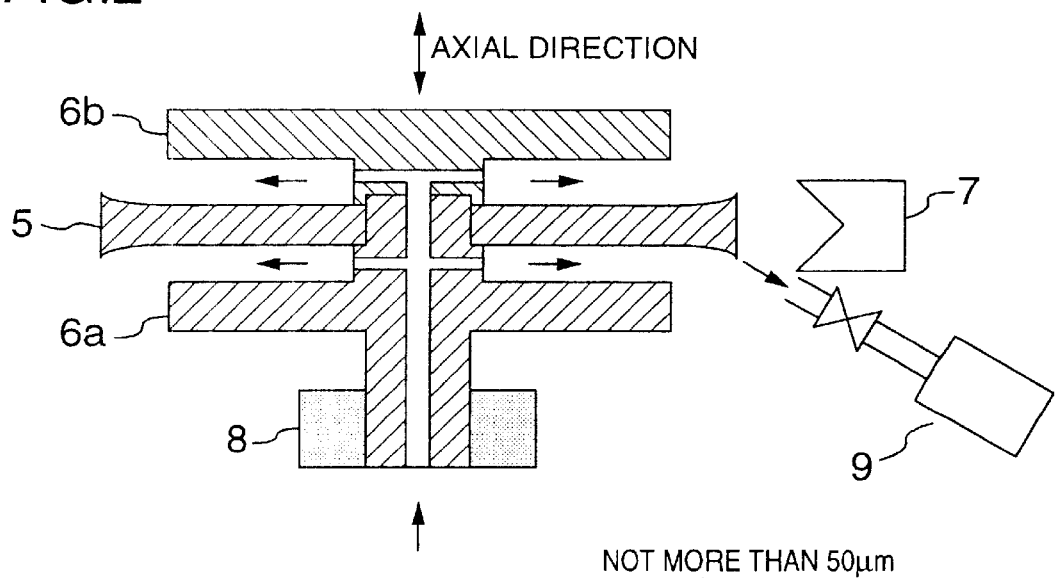
FIG. 2 is a schematic cross-sectional view showing a recording disk treating apparatus.
Figure 3:
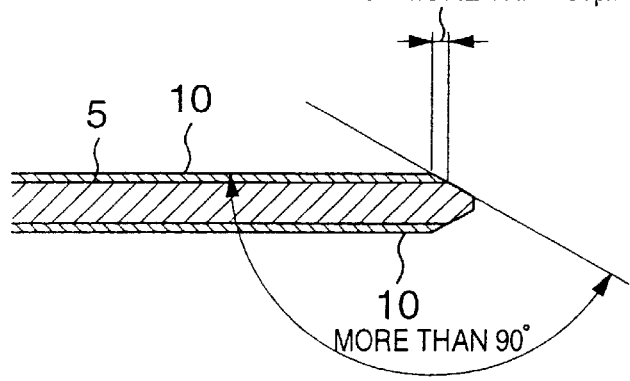
FIG. 3 is a partial cross-sectional view of a recording disk after the recording disk with an overlay on the substrate is treated.
Figure 4:
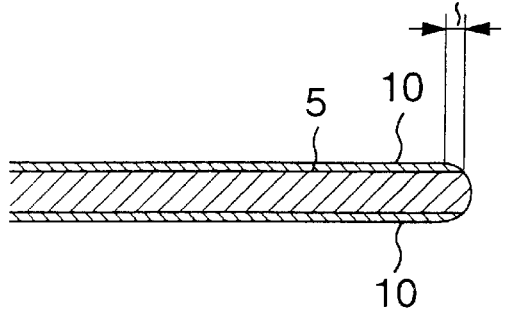
FIG. 4 is a partial cross-sectional view of another recording disk after the another recording disk with the overlay on the substrate is treated.

A substrate 1 with an outer diameter 100 mm, an inner diameter 25 mm, and a thickness 1.2 mm as shown in FIG. 1 is formed of a thermoplastic resin of norbornene type through an injection molding process. The substrate 1 before an overlay 10 is formed thereon has a flat area 3 and a non-flat area 2 whose deformation is caused by a molding process for forming the substrate 1. Subsequently, a SiN layer (thickness 50 nm) on the substrate 1, a CrTi under layer (thickness 30 nm) on the SiN layer, a CoCrPt layer (thickness 20 nm) as a recording layer of the claimed recording substance on the CrTi under layer, and a carbon layer (thickness 10 nm) as a protect layer on the recording layer are formed by sputtering, so that a recording disk 5 is formed. A fluoro-type lubricant is applied onto the protect layer, and a surface of the protect layer is finished by burnishing.

Thereafter, a radially-outer peripheral part of the substrate 1 and the overlay 10 is removed by a forming cutter 7 from the recording disk 5 so that an outer diameter of the recording disk 5 becomes 95 mm. During the cutting, a compressed air flows radially outward along each axial surface of the recording disk 5 from a pair of disk holders 6a and 69 supported on a rotating cramp 8, and is drawn into a vacuuming device 9, so that a contaminant caused by the removal of the radially-outer peripheral part is removed from the recording disk 5. A first embodiment formed as described above has a maximum disk thickness variation rate of 0.15%, and a radial distance between a radially-outer periphery of the overlay 10 and a radially-outer periphery of the substrate 1 as seen in an axial direction of the recording disk 5 is 20 μm.

A difference of a second embodiment with respect to the first embodiment is that the radially-outer peripheral part of the substrate 1 and the overlay 10 is removed by a YAG laser beam in place of the forming cutter 7. The second embodiment has the maximum disk thickness variation rate of 0.12%, and the radial distance of 10 μm.

A difference of a third embodiment with respect to the first embodiment is that the radially-outer peripheral part of the substrate 1 and the overlay 10 is removed by a water jet in place of the forming cutter 7, and the surface of the protect layer is not finished by the burnishing. The third embodiment has the maximum disk thickness variation rate of 0.17%, and the radial distance of 40 μm.

A difference of a fourth embodiment with respect to the first embodiment is that the overlay 10 is arranged at each axial side of the substrate 1. The fourth embodiment has the maximum disk thickness variation rate of 0.16%, and the radial distance of 30 μm.

A difference of a first sample with respect to the first embodiment is that the substrate 1 with the outer diameter 95 mm is made directly through the injection molding without the removal of the radially-outer peripheral part of the substrate 1 and the overlay 10. The first sample has the maximum disk thickness variation rate of 0.52%. The radial distance cannot be measured because the overlay exceeds radially outward the radially-outer periphery of the substrate 1.

A difference of a second sample with respect to the first embodiment is that the removal of the radially-outer peripheral part of the substrate 1 is carried out before the overlay is formed on the substrate 1 through the sputtering. The second sample has the maximum disk thickness variation rate of 0.15%. The radial distance cannot be measured because the overlay exceeds radially outward the radially-outer periphery of the substrate 1.

A difference of a third sample with respect to the first embodiment is that a larger surface roughness in comparison with a surface roughness of the substrate 1 of the first embodiment is applied to the substrate 1 of the third sample by the injection-molding die. The third sample has the maximum disk thickness variation rate of 0.31%, and the radial distance of 100 μm.

A difference of a fourth sample with respect to the fourth embodiment is that the removal of the radially-outer peripheral part of the substrate 1 is carried out before the overlay is formed on the substrate 1 through the sputtering. The fourth sample has the maximum disk thickness variation rate of 0.17%. The radial distance cannot be measured because the overlay exceeds radially outward the radially-outer periphery of the substrate 1. The process of treating each of the embodiments and samples is shown in a table of FIG. 5.

An experimental result of the above embodiments and samples is shown in FIG. 6. The maximum disk thickness variation rate is obtained from a thickness change degree at every radial pitch length of 0.5 mm from an outermost periphery of the disk or substrate toward a center of the disk or substrate in an annular measured area including the outermost periphery, measured by a contact needle type shape measuring device (Tokyo-Seimitsu SURFCOM723B).

The radial distance is an average value of radial distances between the radially-outer periphery of the overlay 10 and the radially-outer periphery of the substrate 1 measured at every angular pitch of 45 degrees by a tool microscope.

A hit number by a slider head running on the recording disk is measured by a glide test apparatus in which an output of piezo-sensor at each of 512 equal partial rotation proceedings into which each rotation of the recording disk is divided is measured, the outputs exceeding 1 V are chosen as slider head hits, and a total number of the chosen outputs is deemed to be the hit number. A radial shift of the slider head per the each rotation is 0.1 mm from a diameter 30 mm to a diameter 94.8 of the recording disk. A stain condition on a slider head running surface after the slider head runs thereon is denoted by ★ (the stain is not visible), ○ (the stain is slightly visible), ▲ (the stain is visible on 2–30% of the slider head running surface), ▼ (the stain is visible on 30–70% of the slider head running surface) and X (the stain is visible on about 100% of the slider head running surface).

A corrosion of the radially-outer peripheral portion (radial width of annular shape thereof from the radially-outer peripheral edge is 10 mm) of the recording disk after 100 hours elapse in an environment of 80° C. and 90% RH of humidity is denoted by ○ (a number of corrosion pit per a unit area is less than 1), ▼ (the number of corrosion pit per the unit area is 1–10), and X (the number of corrosion pit per the unit area is more than 10).

What is claimed is:

1. A recording disk comprising a substrate including a plastic material, and an overlay arranged over the substrate and including a recording substance for recording therein an information, wherein a radially-outer periphery of the overlay is substantially within a radially-outer periphery of the substrate as seen in an axial direction of the recording disk, wherein the substrate includes a main surface which extends substantially perpendicular to the axial direction and on which the overlay is arranged, and a side surface which extends radially outward from the main surface and is prevented from extending parallel to the main surface, the overlay includes a front surface extending substantially parallel to the main surface and exposed to the environment of the recording disk and an edge surface extending radially outward from the front surface, prevented from extending parallel to the front surface and exposed to the environment of the recording disk, and a radially-outer periphery of the front surface is substantially within a boundary between the main surface and the side surface as seen in the axial direction.

2. A recording disk according to claim 1, wherein the radially-outer periphery of the front surface is radially inward distant from the boundary between the main surface and the side surface as seen in the axial direction.

3. A recording disk according to claim 1, wherein a radial distance between the radially-outer periphery of the front surface and the boundary between the main surface and the side surface as seen in the axial direction is not more than 50 μm.

4. A recording disk comprising a substrate including a plastic material, and an overlay arranged over the substrate and including a recording substance for recording therein an information, wherein a radially-outer periphery of the overlay is substantially within a radially-outer periphery of the substrate -as seen in an axial direction of the recording disk, wherein the substrate includes a main surface on which the overlay is arranged and a side surface which extends radially outward from the main surface and is prevented from extending parallel to the main surface, and the overlay extends to a boundary between the main surface and the side surface.

5. A recording disk comprising a substrate including a plastic material, and an overlay arranged over the substrate and including a recording substance for recording therein an information, wherein a radially-outer periphery of the overlay is substantially within a radially-outer periphery of the substrate as seen in an axial direction of the recording disk, wherein the substrate includes a main surface on which the overlay is arranged and a side surface which extends radially outward from the main surface, is prevented from extending parallel to the main surface and exposed to an environment of the recording disk, the overlay includes a front surface extending substantially parallel to the main surface and exposed to the environment of the recording disk and an edge surface extending radially outward from the front surface, prevented from extending parallel to the front surface and exposed to the environment of the recording disk, and an angle between the main surface and a tangential line of the edge surface is more than 90 degrees.

6. A recording disk comprising a substrate including a plastic material, and an overlay arranged over the substrate and including a recording substance for recording therein an information, wherein a radially-outer periphery of the overlay is substantially within a radially-outer periphery of the substrate as seen in an axial direction of the recording disk, wherein the substrate includes a main surface which extends substantially perpendicular to the axial direction and on which the overlay is arranged, and a side surface which extends radially outward from the main surface and is prevented from extending parallel to the main surface, the overlay includes a front surface extending substantially parallel to the main surface and exposed to the environment of the recording disk and an edge surface extending radially outward from the front surface, prevented from extending parallel to the front surface and exposed to the environment of the recording disk, and the radially-outer periphery of the front surface extends substantially along the boundary between the main surface and the side surface.

7. A recording disk comprising a substrate including a plastic material, and an overlay arranged over the substrate and including a recording substance for recording therein an information, wherein a radially outer periphery of the overlay is substantially within a radially-outer periphery of the substrate as seen in an axial direction of the recording disk,
wherein the substrate includes a main surface which extends substantially perpendicular to the axial direction and on which the overlay is arranged, and a side surface which extends radially outward from the main surface and is prevented from extending parallel to the main surface, the overlay includes a front surface extending substantially parallel to the main surface and exposed to the environment of the recording disk and an edge surface extending radially outward from the front surface, prevented from extending parallel to the front surface and exposed to the environment of the recording disk, and the radially-outer periphery of the front surface extends at a radially inner side with respect to the boundary between the main surface and the side surface.

8. A recording disk comprising a substrate including a plastic material, and an overlay arranged over the substrate and including a recording substance for recording therein an information, wherein a radially outer periphery of the overlay is substantially within a radially-outer periphery of the substrate as seen in an axial direction of the recording disk, wherein the substrate includes a main surface which extends substantially perpendicular to the axial direction and on which the overlay is arranged, and a side surface which extends radially outward from the main surface and is prevented from extending parallel to the main surface, the overlay includes a front surface extending substantially parallel to the main surface and exposed to the environment of the recording disk and an edge surface extending radially outward from the front surface, prevented from extending parallel to the front surface and exposed to the environment of the recording disk.

9. A recording disk comprising a substrate including a plastic material, and an overlay arranged over the substrate and including a recording substance for recording therein an information, wherein a radially-outer periphery of the overlay is substantially within a radially-outer periphery of the substrate as seen in an axial direction of the recording disk, and a radial distance between the radially-outer periphery of the overlay and the radially-outer periphery of the substrate is not more than 40 μm.

10. A recording disk according to claim 9, wherein the substrate has a first radially extending surface exposed to the environment of the recording disk between the radially-outer periphery of the overlay and the radially-outer periphery of the substrate, the overlay has a second radially extending surface exposed to the environment of the recording disk, and the first and second radially extending exposed surface join each other.

11. A recording disk according to claim 10, wherein the first radially extending surface is inclined with respect to each of axial and radial directions of the recording disk perpendicular to each other.

12. A recording disk comprising a substrate including a plastic material, and an overlay arranged over the substrate and including a recording substance for recording therein an information, wherein a radially-outer periphery of the overlay is substantially within a radially-outer periphery of the substrate as seen in an axial direction of the recording disk, wherein the overlay includes a front surface extending substantially parallel to the main surface and exposed to the environment of the recording disk and an edge surface extending radially outward from the front surface, prevented from extending parallel to the front surface and exposed to the environment of the recording disk, and an outer periphery of the front surface extends at a radially inner side with respect to an outer periphery of the edge surface.

13. A method for producing a recording disk including a substrate and an overlay on the substrate, comprising the steps of:
   forming the substrate including a plastic material,
   forming on the substrate the overlay including a recording substance for recording therein an information, and
   removing a radially-outer peripheral part of the substrate after forming the overlay.

14. A method according to claim 13, wherein a disk thickness variation rate on the radially-outer peripheral part before removing the radially-outer peripheral part is more than 0.2 (%), when the disk thickness variation rate=100*Δt/Δr (%), Δr is a unit radial length value, and Δt is a thickness variation value in the unit radial length.

15. A method according to claim 13, wherein the radially-outer peripheral part of the substrate is removed in such a manner that a radially-outer periphery of the overlay is substantially within a radially-outer periphery of the substrate as seen in an axial direction of the recording disk, after removing the radially-outer peripheral part of the substrate.

16. A method according to claim 15, wherein the radially-outer peripheral part of the substrate is removed in such a manner that a radially-outer periphery of a front surface of the overlay extending substantially perpendicular to the axial direction is radially inwardly distant from a radially-outer periphery of a main surface of the substrate extending substantially perpendicular to the axial direction, as seen in the axial direction, after removing the radially-outer peripheral part of the substrate.

17. A method according to claim 16, wherein a radial distance between the radially-outer periphery of the front surface and the radially-outer periphery of the main surface as seen in the axial direction is not more than 50 μm.

18. A method according to claim 13, wherein a radially-outer peripheral part of the overlay is removed simultaneously with removing the radially-outer peripheral part of the substrate.

19. A method according to claim 13, wherein the removal of the radially-outer peripheral part of the substrate is carried out by a cutting process while rotating the recording disk.

20. A method according to claim 13, wherein a part of the overlay is removed when removing the radially-outer peripheral part of the substrate, until exposing a part of the substrate covered by the part of the overlay before removing the part of the overlay to an environment of the recording disk.

21. A method according to claim 13, wherein a surface of the overlay to be exposed to an environment of the recording disk is made contact with a cleaning element to remove a contaminant from the surface by a contact-slide relative movement between the surface and the cleaning element, after removing the radially-outer part of the substrate.

* * * * *